Sept. 8, 1970
T. J. GRIFFEN
3,527,326
TRANSMISSION NEUTRAL START CONTROL VALVE
Filed Nov. 27, 1968
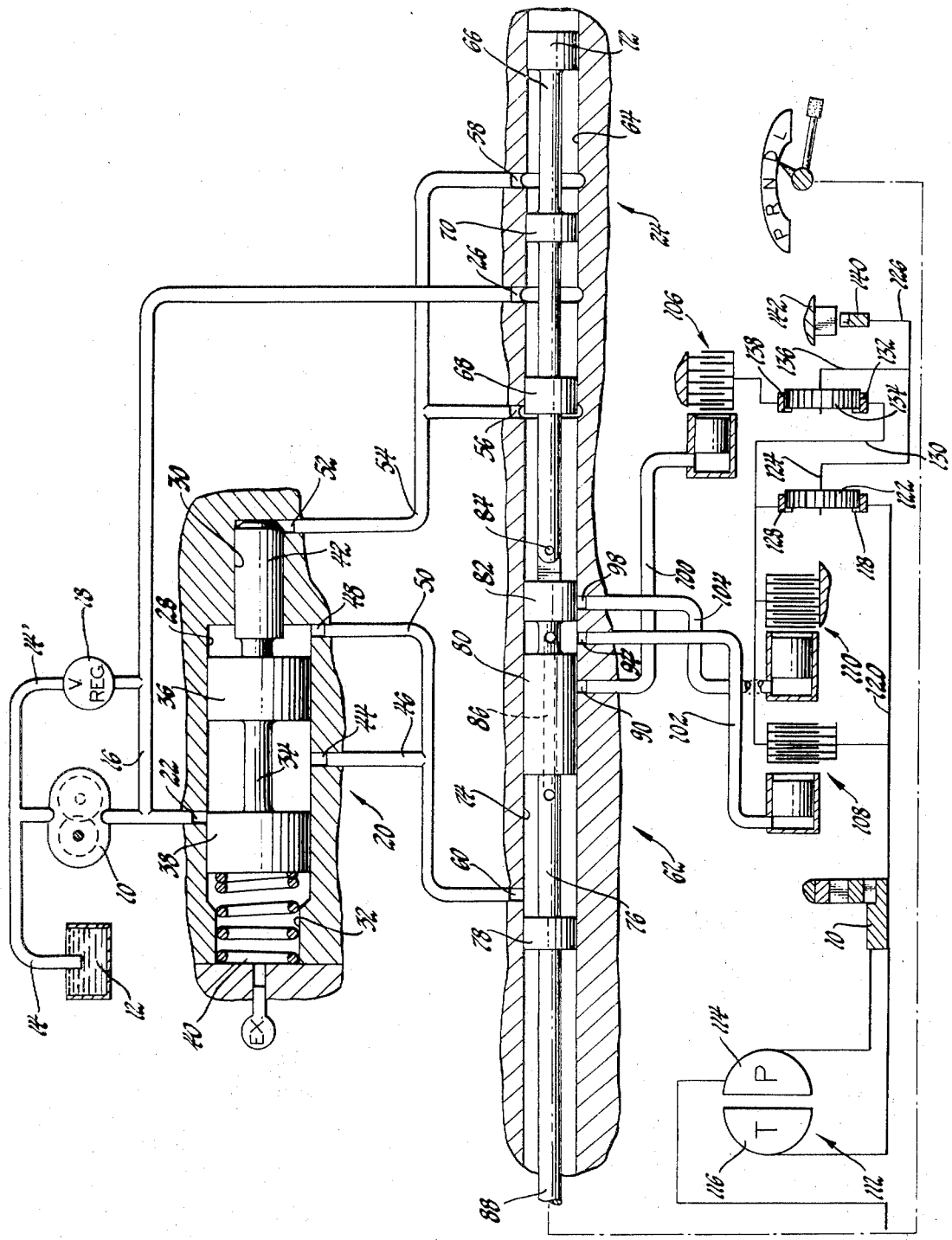
INVENTOR.
Thomas J. Griffen
BY
a. M. Heiter
ATTORNEY

United States Patent Office

3,527,326
Patented Sept. 8, 1970

3,527,326
TRANSMISSION NEUTRAL START CONTROL VALVE
Thomas J. Griffen, Dearborn, Mich., assignor to General Motors Corporation, Detroit, Mich., a corporation of Delaware
Filed Nov. 27, 1968, Ser. No. 779,517
Int. Cl. F16h *3/44, 57/10;* G05g *9/08*
U.S. Cl. 192—4                                   12 Claims

ABSTRACT OF THE DISCLOSURE

A transmission control in which the control fluid is directed to the manual selector valve through a line control valve. The line control valve is spring biased to the closed position thereby preventing fluid communication between the pressure source and the manual selector valve during start-up. Opening of the line control valve is controlled by a neutral-park control valve which is connected to the manual selector valve. The neutral-park control valve provides fluid communication between the source and an actuator portion of the line control valve which opens the line control valve spool only when the manual selector valve is in the neutral or park position. Once the line control valve is opened, fluid pressure between the line control valve and the manual selector valve is directed to one end of the line control valve spool to hold it open against the spring until the pressure source becomes inoperative.

---

This invention relates to transmission controls and more particularly to transmission controls wherein the transmission selector must be placed in neutral or park before control fluid is available to be distributed by the selector valve to the transmission control elements.

Neutral start switches of the electrical type are used in the majority of the transmissions presently available. These electrical switches are normally actuated by the transmission linkage and are incorporated in the electrical circuit provided for engine starting. The electrical neutral start switches are mechanically closed when the transmission selector lever is in neutral or park thus permitting the engine starter to be energized. When the transmission selector is in a forward or reverse drive position, the electrical switch is open thus preventing the engine starter from being energized. The present invention does not incorporate an electrical lockout feature, but it does provide a hydraulic lockout feature. Thus, when the present invention is incorporated in a transmission control, engine starting can be accomplished, but forward or reverse drive engagement in the transmission is prevented until the transmission selector is first placed in neutral or park and then moved to a drive position.

The present invention includes a line control valve having an actuator portion. The line control valve is in the fluid passage of the transmission control between the fluid pressure source and the manual selector valve. The line control valve is biased by a spring to the closed position thereby preventing fluid communication between the fluid source and the manual selector valve so that fluid pressure is not available to be distributed by the manual selector valve to the various brakes and clutches of the transmission. The line control valve is operated by a neutral or park pressure signal directed by passages to the actuator portion. A neutral-park valve is operatively connected to the manual selector valve and is movable therewith to direct the neutral or park signal to the actuator portion when the manual selector valve is in neutral or park. Once the line control valve has been opened, the fluid pressure downstream of the line control valve is directed to one end of the line control valve to hold it open against the bias spring, provided the pressure source continues operating. Therefore, as long as the engine is operating and fluid pressure is available, the line control valve will remain open regardless of the provision of the manual selector.

It is, therefore, an object of this invention to provide in a transmission control a line control valve which prevents distribution of fluid pressure by the transmission selector valve, upon initial operation of the transmission, until the transmission selector valve is first moved to the neutral or park position.

This and other objects and advantages of the present invention will become more apparent from the following description and drawing, which is a diagrammatic view of a portion of the transmission control, of the preferred embodiment.

Referring to the drawing, there is shown a fluid pump 10 which is of conventional design. The pump 10 is located in the transmission housing and is driven by the vehicle engine. This is the normal and accepted design approach for automatic transmission control system. Thus, when the vehicle engine is not operating, the pump does not provide fluid pressure for the control system. When the pump is operating, it draws fluid from a pump or reservoir 12 through an inlet passage 14 and delivers fluid under pressure to a pressure passage 16. The pressure level in passage 16 is established by the conventional regulator valve 18 which is operable to bypass excess fluid from pressure passage 16 to inlet passage 14' from which the fluid is directed either to inlet of pump 10 or the sump 12.

The pressure passage 16 is connected to the line control valve 20 at port 22 and to a neutral park control valve 24 at port 26. The line control valve 20 includes the large bore 28, a small bore 30 and a spring chamber 32. A line control valve spool 34 is slidably disposed in the bore 28 and has two equal diameter spaced lands 36 and 38. A spring 40 is located in the spring chamber 32 and contacts land 38 to bias the line control valve spool 34 rightward in bore 28 so that land 38 closes port 22 to the space between lands 36 and 38. An actuator plug valve 42 is slidably disposed in the bore 30 and is movable therein to permit contact with the right end of valve land 36. The line control valve 20 also has an outlet port 44 which is connected to passage 46, a control port 48 which is connected to control passage 50 and an actuator port 52 which is connected to an actuator passage 54. The actuator passage 54 is connected to a neutral port 56 and a park port 58 of the neutral park valve 24. The passage 46 is connected to a port 60 of a manual selector valve 62, and the control passage 50 is connected to passage 46.

The neutral park control valve 24 includes a single diameter bore 64 which is in fluid communication with the ports 26, 56 and 58 and a valve spool 66 which has three equal diameter spaced lands 68, 70 and 72 slidably disposed in the bore 64. The manual selector valve has a single diameter bore 74, axially aligned with the bore 64, in which is slidably disposed a valve spool 76 having equal diameter spaced lands 78, 80 and 82. The valve spool 76 is pivotally connected at 84 to the valve spool 66. A passage 86 in spool 76 connects the space between lands 78 and 80 with the space between lands 80 and 82. A stem 88 on the left end of valve spool 76 is operatively connected by a conventional linkage (not shown) to a manual selector lever to permit the operator to move the valve spools 76 and 66 to a plurality of positions such as park (P), reverse (R), neutral (N), drive (D), and low (L). The manual selector valve 62 also includes a reverse port 80, a drive port 94, and a low port 98. The passage 86 permits distribution of pressure fluid from port 60 to the ports 90, 94, and 98 which ports are aligned with the space between lands 80 and 82 when the valve spool 76 is in the reverse (R), drive (D), and low (L) positions respectively.

The ports 90, 94 and 98 are connected to passages 100, 102 and 104 respectively which, in turn, are connected to a reverse brake 106, a direct clutch 108 and a low brake 110 of a transmission. The transmission also includes a fluid coupling 112 having an engine driven impeller 114 and a turbine 116. The turbine 116 drives a sun gear 118 through a shaft 120. The sun gear 118 meshes with planet pinions 122 which are rotatably mounted on a carrier 124 connected to the output shaft 126. Also meshing with the pinions 122 is a ring gear 128 which is connected to the low brake 110 and, via hub 130, to a sun gear 132. The sun gear 132 meshes with pinions 134 which are rotatably mounted on a carrier 136 which is also connected to the output shaft 126. Also meshing with the pinions 134 is a ring gear 138 which is connected to the reverse brake 106. A park gear 140 is secured to the output shaft 126 and is adapted to be engaged by a park pawl 142 which is mounted in a stationary housing and operatively connected via linkage, such as that shown in the patent to Mrlik et al. 2,875,856, to the manual selector valve spool 76. Thus, when the selector valve is in park (P), the pawl 142 engages gear 140 to prevent rotation of the output shaft 126. The sun gear 118 and ring gear 128 may be selectively connected by the direct clutch 108 to provide a direct or one-to-one ratio between input shaft 120 and output shaft 126. When the low brake 110 is engaged, the ring gear 128 is stationary and the carrier 124 is driven forwardly at a reduced ratio. When the reverse brake 106 is engaged, the carrier 136 is driven in reverse at a reduced ratio. The manual selector valve 62 can be modified to be operable in more sophisticated transmission control systems such as that shown in the patent application of Moore et al. S.N. 759,671 filed Sept. 13, 1968.

Assuming the pump 10 is operating, fluid pressure is available in passage 16 which is connected to the neutral park control valve 24 at port 26 and port 22 of the line control valve 20. In the position shown, the line control valve 20 is closed so that land 38 prevents fluid communication between ports 22 and 44. Thus, fluid pressure is not available in passage 46 or the port 60 of the manual selector valve 62. With the manual selector valve 62 and the neutral park valve 24 in drive position (D), the port 26 is between lands 68 and 70 while the port 56 and 58 in actuator passage 54 are open to exhaust. Thus, no fluid pressure is available in the actuator passage 54 to operate the actuator valve 42. If the manual selector valve 62 is moved to the low position (L), the ports 56 and 58 remain closed to port 26 by the lands 68 and 70. If the manual selector valve 62 is moved to the reverse position (R), the port 26 is closed by land 70. If the manual selector valve 62 is moved to the neutral position (N), port 26 is open to port 56 between lands 68 and 70 so that fluid pressure in pressure passage 16 will enter the actuator passage 54. If the manual selector valve 62 is moved to the park position (P), port 26 is open to port 58 between lands 70 and 72 thereby communicating fluid pressure in passage 16 to the neutral park passage 54.

When fluid pressure is present in the actuator passage 54, the fluid acts on the right end of the actuator valve 42 thereby moving the actuator valve 42 and the line control valve spool 34 leftward against the spring 40 to permit fluid communication from port 22 to port 44 and passage 46, between lands 36 and 38. The pressure level, in passage 54, necessary to move the actuator valve 42 and the line control valve spool 34 is determined by the end area of actuator valve 42 and the force of spring 40. The pressure level necessary to open the line control valve 20 can be established at a variety of values. For example, it may be desirable to limit the opening of the line control valve 20 to instances when the pressure level in passage 16 is sufficient to fully engage the clutch and brakes. Once the fluid pressure is available in passage 46, it will be directed by the control passage 50 to the right end of the line control valve spool 34, thus holding the line control valve spool 34 open irregardless of the position of the neutral park control valve 24. The line control valve spool 34 will remain open until the pump 10 ceases to operate or until the pressure in passage 50 falls below a value determined by the end area of land 36 and the force of spring 40. If it is desirable to have the line control valve 20 open, in neutral or park, and close, in drive, at essentially the same pressure level, the actuator 42 can be made integral with the spool 34 so that the end areas of land 36 and actuator 42 are equal.

Therefore, it will be seen from the above discussion that upon initial start-up of the pump 10, no fluid pressure is available at the manual selector valve 62 until the manual selector valve 62 has been shifted to either the neutral or park position. Thus, it is evident that when the vehicle engine is started with the manual selector valve in any position other than neutral or park, no drive between the engine and the vehicle wheels will be available until either neutral or park is first selected by the operator. However, once the line control valve spool 34 has been opened, it will remain open, irregardless of the position of the selector valve 62, until the pump 10 is stopped.

It should be understood that the above description and drawing are presented as the preferred embodiment and are not intended as limitations since obvious modifications will occur to persons skilled in the art.

What is claimed is:

1. A transmission control including engine driven fluid pump means; fluid passage means operatively connected to said pump means for conducting fluid under pressure; manual selector means operatively connected in said passage means and moveable to drive and neutral positions; line control valve means having open and closed positions and being operatively connected in said passage means between said pump means and said manual selector means for directing fluid to said manual selector means when said line control valve means is in said open position; and neutral control valve means operatively connected to and moveable with said selector means and operatively connected in said passage means between said pump means and said line control valve means for directing control fluid to open said line control valve means when said pump is operating and said manual selector means is in said neutral position.

2. The invention defined in claim 1 and said line control valve means being normally biased to said closed position, said neutral control valve in said drive position disconnecting the supply of said control fluid to said line control valve means and means operative when said line control valve means is in the open position and delivering fluid under pressure from said pump means to said manual selector means to hold said line control valve means in said open position.

3. In a transmission control engine driven fluid source means; line control valve means, in fluid communication with said source means and movable to an open and closed position, including actuator means for opening said line control valve means; selector valve means in fluid communication with said line control valve means and being movable to forward drive, reverse drive, neutral and park positions; and neutral control valve means operatively connected to and movable with said selector valve means to provide fluid communication between said source means and said actuator means to open said line control valve means when said selector valve is in the neutral or park position; said line control valve means being operable to prevent fluid communication between said source means and said selector valve means when in said closed position and to permit fluid communication between said source means and said selector valve means when in said open position.

4. The invention defined in claim 3 and said line control valve means including a valve bore, inlet and outlet ports in fluid communication with said valve bore, a line control valve spool slidable in said valve bore to said open and closed positions to control fluid communication between said inlet and outlet ports, spring means acting on one end of said line control valve spool to bias said line control valve spool to said closed position, and a line control port in said valve bore at the end of said line control valve spool opposite said spring means; said actuator means including a valve bore, a valve spool slidable in said valve bore abutting the end of said line control valve spool opposite said spring means, an actuator control port in said valve bore for directed fluid to the end of said valve spool opposite said line control valve spool; and said transmission control having fluid passage means for conducting fluid including line passage means from said fluid source means to said inlet port and said neutral control valve means, passage means from said outlet port to said selector valve means, control passage means from said passage means to said line control port, and actuator passage means from said neutral control valve means to said actuator control port.

5. A transmission including engine driven input means; output means; multi-ratio planetary gear means for operatively connecting said input and output means; selectively operable drive ratio establishing means operatively connected to said planetary gear means for establishing various drive ratios and neutral in said planetary gear means; fluid source means driven by said input means providing fluid under pressure; control valve means in fluid communication with said source means having an open position and normally biased to a closed position having actuating means responsive to fluid pressure to open said line control valve means; selector valve means in fluid communication with said line control valve means and being selectively movable to drive and neutral positions to control the supply of fluid to said ratio establishing means for selective establishment of drive ratios, neutral in said planetary gear means; and neutral valve means operatively connected to and movable with said selector valve means to provide fluid communication between said source means and said actuator means to move said actuator means to open said line control valve means when said selector valve is in said neutral position and prevent communication in said drive position, said line control valve means being operable in said closed position to prevent fluid communication between said source and said selector valve means and in the open position to permit fluid communication therebetween and to said actuating means to hold said line control valve in said open position as long as said source means provides fluid pressure.

6. The invention defined in claim 5 and said actuator means holding said line control valve in said open position only as long as said source means provides the proper pressure for actuating said drive ratio establishing means.

7. The invention defined in claim 5 and park brake means selectively operable to hold said output means stationary and said selector valve means also having a park position also controlling the supply of fluid to said ratio establishing means to establish neutral and to operate said park brake means to hold said output means and said neutral valve means being operable in park position to supply fluid to said actuating means to open said line control valve.

8. In a transmission control, fluid source means for providing pressure fluid for said control; a manual valve movable to drive, park and neutral position; a neutral control valve operatively connected to and movable with said manual valve and in fluid communication with said source means; line control valve means including spool valve means movable to open and closed positions, spring means for biasing said spool valve means to the closed position, and actuator means responsive to fluid pressure for moving said spool valve means against said spring means; and passage means including supply passage means for conducting fluid to said spool valve means and said neutral control valve, delivery passage means for conducting fluid from said spool valve means to said manual valve when said spool valve means is in the open position, control passage means for conducting fluid from said delivery passage means to one end of said spool valve means; and actuator control passage means for conducting fluid from said neutral control valve to said actuator means when said manual valve is in the park or neutral position and for exhausting fluid from said actuator means when said manual valve is in the drive position; said spool valve means being held in the closed position by said spring means until said manual valve and said neutral control valve are moved to the park or neutral position and said neutral control valve directs fluid through said actuator control passage means to said actuator means to open said line control valve means.

9. A transmission including engine driven input means; output means; multi-ratio planetary gear means for operatively connecting said input and output means; selectively operable drive ratio establishing means operatively connected to said planetary gear means for establishing various drive ratios and neutral in said planetary gear means; fluid source means driven by said input means providing fluid under pressure; fluid passage means operatively connected to said fluid source means for conducting fluid under pressure; manual selector means operatively connected in said passage means and movable to drive and neutral positions; line control valve means having open and closed positions and being operatively connected in said passage means between said pump means and said manual selector means for directing fluid to said manual selector means when said line control valve means is in said open position; and neutral control valve means operatively connected to and movable with said selector means and operatively connected in said passage means between said fluid source means and said line control valve means for directing control fluid to open said line control valve means when said fluid source means is operating and said manual selector means is in said neutral position.

10. The invention defined in claim 9 and said line control valve means being normally biased to said closed position, said neutral control valve in said drive position disconnecting the supply of said control fluid to said line control valve means and means operative when said line control valve means is in the open position and delivering fluid under pressure from said fluid source means to said manual selector means to hold said line control valve means in said open position.

11. The invention defined in claim 9 and said line control valve means including actuator means for holding said line control valve means in said open position only as long as said source means provides the proper pressure for actuating said drive ratio establishing means.

12. The invention defined in claim 11 and park brake means selectively operable to hold said output means stationary and said selector valve means also having a park position also controlling the supply of fluid to said ratio establishing means to establish neutral and to operate said park brake means to hold said output means, and said neutral control valve means being operable in park position to supply fluid to said actuator means to open said line control valve means.

(References on following page)

References Cited

UNITED STATES PATENTS

| | | | |
|---|---|---|---|
| 2,955,482 | 10/1960 | Winchell | 74—856 |
| 3,006,213 | 10/1961 | Wilson | 74—861 |
| 3,033,333 | 5/1962 | Breting et al. | 192—4 |
| 3,042,162 | 7/1962 | Hause | 192—4 |
| 3,361,234 | 1/1968 | Runyon | 192—4 |

ARTHUR T. McKEON, Primary Examiner

U.S. Cl. X.R.

74—473, 753

PO-1050
(5/69)

UNITED STATES PATENT OFFICE
CERTIFICATE OF CORRECTION

Patent No. 3,527,326      Dated September 8, 1970

Inventor(s)     Thomas J. Griffen

It is certified that error appears in the above-identified patent and that said Letters Patent are hereby corrected as shown below:

Column 3, line 3, "80" should read -- 90 -- .

SIGNED AND
SEALED
NOV 24 1970

(SEAL)
Attest:

Edward M. Fletcher, Jr.

Attesting Officer

WILLIAM E. SCHUYLER, JR.
Commissioner of Patents